(12) United States Patent
Bowlds

(10) Patent No.: US 6,417,796 B1
(45) Date of Patent: Jul. 9, 2002

(54) DOPPLER-BASED TRAFFIC RADAR SYSTEM

(75) Inventor: Harvey F. Bowlds, Owensboro, KY (US)

(73) Assignee: Mph Industries, Inc., Owensboro, KY (US)

(*) Notice: Subject to any disclaimer, the term of this patent is extended or adjusted under 35 U.S.C. 154(b) by 0 days.

(21) Appl. No.: 09/845,706

(22) Filed: Apr. 30, 2001

Related U.S. Application Data

(63) Continuation-in-part of application No. 09/432,341, filed on Nov. 2, 1999, now abandoned, which is a continuation-in-part of application No. 09/154,314, filed on Sep. 16, 1998, now Pat. No. 6,008,752.

(51) Int. Cl.⁷ .............................................. G01S 13/58
(52) U.S. Cl. ...................... 342/104; 342/114; 342/115; 342/116; 342/189; 342/192; 342/196
(58) Field of Search ................................. 342/104, 114, 342/115, 116, 189, 192, 195, 196

(56) References Cited

U.S. PATENT DOCUMENTS

| | | | |
|---|---|---|---|
| 3,438,031 A | 4/1969 | Fathauer | 342/92 |
| 3,689,921 A | 9/1972 | Berry | 342/115 |
| 3,750,172 A | 7/1973 | Tresselt | 342/129 |
| 3,870,990 A | 3/1975 | Fathauer | 340/939 |
| 3,898,655 A | 8/1975 | Tresselt | 342/83 |
| 3,899,772 A | 8/1975 | Mead et al. | 340/10.51 |
| 3,936,824 A | 2/1976 | Aker et al. | 342/115 |
| 4,020,490 A | 4/1977 | Millard | 342/115 |
| RE29,401 E | 9/1977 | Aker et al. | 342/115 |
| 4,052,722 A | 10/1977 | Millard | 342/115 |
| 4,070,634 A | 1/1978 | Barker et al. | 331/2 |
| 4,148,028 A | 4/1979 | Fujiki | 342/70 |
| 4,214,243 A | 7/1980 | Patterson | 342/115 |
| 4,219,878 A | 8/1980 | Goodson et al. | 702/143 |
| 4,236,140 A | 11/1980 | Aker et al. | 342/115 |
| 4,293,859 A | 10/1981 | Sergent | 343/702 |
| 4,335,382 A | 6/1982 | Brown et al. | 342/104 |
| 4,335,383 A | 6/1982 | Berry | 342/115 |
| 4,740,045 A | 4/1988 | Goodson et al. | 342/112 |
| 4,743,908 A | 5/1988 | Brassfield et al. | 342/113 |

(List continued on next page.)

OTHER PUBLICATIONS

Slaolnik, M., Introduction to Radar Systems; McGraw–Hill (1962); pp. 82–85.

Kalmus, H.P., Direction Sensitive Doppler Device; Proceedings of the IRE (Jun. 1955); pp. 698–700.

Applied Concepts, Inc., "Brochure," Stalker DSR, Date Unknown.

*Primary Examiner*—John B. Sotomayor
(74) *Attorney, Agent, or Firm*—King & Schickli, PLLC

(57) ABSTRACT

A Doppler-based radar system and related method are provided for determining the direction and speed of at least one selected target traveling in the same lane as a moving patrol vehicle supporting the radar system independent of the direction of the target relative to the platform. The radar system includes an oscillator to generate a signal, an antenna to transmit the signal toward the at least one target and to receive a return signal reflected from the at least one target, a turnstile in communication with the antenna for receiving the return signal and forming processing signals which are different in phase, and circuitry for determining the direction of the at least one target relative to the platform. In particular, samples of the processing signals are transformed into the frequency domain and cross-correlated forming cross-correlation components. The radar system selects a target from the imaginary cross-correlation components dependent upon a mode of operation of the radar system and calculates the speed of the at least one target dependent upon a determined direction of the target and displays the speed for the operator's use. Advantageously, the radar system and method of operation allow the speed of the at least one target to be monitored without manual assistance from the operator.

30 Claims, 5 Drawing Sheets

U.S. PATENT DOCUMENTS

| | | | |
|---|---|---|---|
| 4,818,999 A | 4/1989 | Kobayashi et al. | 342/59 |
| 5,150,128 A | 9/1992 | Kongelbeck | 342/174 |
| 5,181,038 A | 1/1993 | Asbury et al. | 342/70 |
| 5,285,207 A | 2/1994 | Asbury et al. | 342/129 |
| 5,402,129 A | 3/1995 | Gellner et al. | 342/70 |
| 5,504,488 A | 4/1996 | Henderson et al. | 342/115 |
| 5,510,795 A | 4/1996 | Koelle | 342/114 |
| 5,525,996 A | 6/1996 | Aker et al. | 342/104 |
| 5,528,245 A | 6/1996 | Aker et al. | 342/104 |
| 5,528,246 A | 6/1996 | Henderson et al. | 342/115 |
| 5,557,281 A | 9/1996 | O'Conner | 342/114 |
| 5,563,603 A | 10/1996 | Aker et al. | 342/115 |
| 5,565,871 A | 10/1996 | Aker et al. | 342/176 |
| 5,570,093 A | 10/1996 | Aker et al. | 342/104 |
| 5,691,724 A | 11/1997 | Aker et al. | 342/104 |
| 6,008,752 A * | 12/1999 | Husk et al. | 342/104 |
| 6,198,427 B1 | 3/2001 | Aker et al. | 342/114 |

* cited by examiner

DOPPLER-BASED TRAFFIC RADAR SYSTEM

This is a continuation-in-part application of U.S. patent application Ser. No. 09/432,341 filed Nov. 2, 1999, entitled "Doppler-based Traffic Radar System" now abandoned which is a continuation-in-part of application Ser. No. 09/154,314 U.S. Pat. No. 6,008,752, filed Sep. 16, 1998, entitled "Doppler-based Traffic Radar System."

TECHNICAL FIELD

The present invention relates generally to a Doppler-based traffic radar system and, more particularly to a radar system and related method for determining the speed of target vehicles independent of the direction of the target vehicles relative to a patrol vehicle supporting the radar system.

BACKGROUND OF THE INVENTION

Law enforcement officers have utilized Doppler-based traffic radar systems to monitor vehicle speeds and enforce traffic speed limit laws for many years. Throughout this period of time, numerous improvements in both the underlying technology and in the specific application of new processing techniques for the traffic radar systems themselves, have afforded law enforcement officers greater flexibility and improved reliability in carrying out their duties. One such improvement evident in most traffic radar systems presently being marketed includes the capability to more accurately and reliably monitor the speed of certain vehicles while the patrol vehicle is either in a stationary or a moving mode of operation. In fact, present traffic radar systems can now successfully monitor the speed of vehicles approaching the moving patrol vehicle in an opposite lane, and monitor a group of target vehicles simultaneously and to determine the fastest vehicle within the group and/or the vehicle presenting the traditional strongest reflected return signal. Importantly, each of these new or improved capabilities provide the law enforcement officer with a more complete picture of the traffic environment and thus, a more flexible and reliable basis for making more informed decisions.

Despite all the improvements in both the underlying technology utilized in these traffic radar systems and the radar systems themselves, however, a broadly recognized shortcoming of these systems involves the successful monitoring of the speed of vehicles approaching or receding away from the patrol vehicle in a same-lane moving mode of operation or in a stationary mode of operation without operator intervention. Such a radar system and related methods are provided for in the applicant's U.S. Pat. No. 6,008,752 wherein a direction of a selected target is determined and utilized in calculating its speed both in same-lane moving and stationary modes of operation without the need for operator intervention.

One additional radar system capable of monitoring the speed of vehicles approaching or receding away from the patrol vehicle in a same-lane moving mode of operation is described in U.S. Pat. No. 6,198,427 to Aker et al. A digital signal processor is utilized to perform a complex fast Fourier transform utilizing a first radar return signal as imaginary inputs and a second radar return signal which is shifted in phase by an integer multiple of 90 degrees as real inputs. The output of the complex fast Fourier transform includes an approaching half spectrum of components and a paired receding half spectrum of components as a result of common microwave hardware imperfections. Either or both half spectrums are selectively searched depending upon a mode of operation of the radar system.

One shortcoming of utilizing a complex fast Fourier transform, without more, to obtain target spectrums is the inherent redundancy of targets in the approaching and receding spectrums which necessitate additional qualification testing, such as bleed through directionality testing, in order to prevent false information regarding targets. Even with bleed through testing, common mode signals and mismatches in the microwave hardware may be sufficient to generate additional false target information which are undetectable by bleed through testing and require additional qualification testing to eliminate.

Accordingly, a need is clearly identified for a radar system and related methods capable of simply yet accurately determining the actual speed of target vehicles traveling in the same lane as the moving patrol vehicle, or in a different lane than the stationary patrol vehicle which eliminates the need for bleed through testing and significantly limits the need for qualification testing. Such a radar system and related methods would effectively eliminate the need for bleed through qualification testing, and significantly limit the need for qualification testing caused by common mode signals and mismatches in microwave hardware in determining target speeds.

SUMMARY OF THE INVENTION

Accordingly, it is a primary object of the present invention to provide a novel and improved Doppler-based radar system capable of overcoming the limitations of the prior art.

Another object of the present invention is to provide a Doppler-based traffic radar system that increases the overall flexibility and reliability afforded a system operator.

Additional objects, advantages, and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, a novel and improved Doppler-based traffic radar system is provided that increases the overall flexibility and reliability afforded the system operator, and most importantly, effectively eliminates the need for bleed through testing, and significantly limits the need for qualification testing. More specifically, the radar system of the present invention is adapted to determine the speed of at least one moving target traveling in generally the same direction as a platform supporting the radar system independent of the direction of the at least one target relative to the platform. This allows the speed of target vehicles traveling in the same lane and in the same direction as the patrol vehicle to be monitored without manual intervention by the operator. The radar system is further adapted in a stationary mode of operation to determine the speed of at least one selected moving target independent of the location of the patrol vehicle. This is accomplished in part by selectively eliminating from consideration all unwanted approaching or receding targets depending upon the present traffic/patrol scenario.

The radar system of the present invention splits the return signals reflected from the at least one moving target in order to form a test processing signal and a reference processing signal. More specifically, the return signals received from an antenna are split in a turnstile, thus generating first and second split signals. The split signals are substantially equivalent both containing information about the at least one target. Within the turnstile the first split signal is mixed with a first portion of the transmitted signal to form a test processing signal. Likewise, the second split signal is mixed with a second portion of the transmitted signal to form a reference processing signal.

Any suitable means may be used to insure that the resultant processing signals are different in phase. For example, use of microstrip transmission lines of differing lengths connecting each of a pair of sniffer probes for coupling portions of the transmitted signal to the mixers, and/or transmission lines of differing lengths connecting each of the first and second split signals to the mixers, is sufficient to cause the signals to be different in phase. Alternatively, a phase shifter or other means generally known in the art may be utilized.

Because the resulting processing signals are equal in magnitude, but different in phase, the direction of the at least one target relative to the platform can be determined and the speed accurately calculated. For instance, if the phase of the reference signal for an approaching target leads the phase of the test signal, then the phase of the reference signal for a receding target will lag the phase of the test signal. This phase differential in the processing signals also allows the radar system to more accurately calculate the speed of a selected target in the stationary mode of operation.

In accordance with an important aspect of the present invention, speed determining circuitry, such as a processor or the like, transforms samples of the test and reference processing signals from the time domain to the frequency domain to provide at least one frequency spectrum. As is well known in the art, the resulting frequency spectrum of a time to frequency domain transformation necessarily includes a plurality of bins indicative of the Doppler components of the at least one target. More specifically, the Doppler components include the amplitude and frequency of each target.

The resulting Doppler components of the at least one frequency spectrum are subsequently cross-correlated by the speed determining circuitry to obtain a cross-correlation spectrum of real and imaginary cross-correlated components. In accordance with an important aspect of the present invention, the resulting components of the cross-correlation are indicative of the direction and speed of the at least one target.

During operation, the radar system selects a target from the cross-correlation components according to the present operating mode of the radar system. In a moving, strongest target mode of operation, for example, the cross-correlation components are searched for a target having the highest amplitude. Similarly, in a moving, fastest target mode of operation, the cross-correlation components are searched for a target having the highest frequency. Additional modes of operation of radar systems are generally well known in the art and may require the radar system to determine the speed of a target in a stationary, strongest mode; a stationary, fastest mode; a stationary, strongest and fastest mode; a moving, strongest, opposite lane mode; a moving, strongest, same lane mode; a moving, fastest, opposite lane mode; a moving, fastest and strongest, opposite lane mode; a moving, fastest, same lane mode; a moving, fastest, same lane mode; or a moving fastest and strongest same lane mode.

Once the step of selecting a target is accomplished, the speed of the at least one target is calculated dependent upon a determined direction of the target and displayed by the radar system for the operator's use. Advantageously, this allows for the speed of multiple targets to be determined and displayed.

Still other objects of the present invention will become readily apparent to those skilled in this art from the following description wherein there is shown and described a preferred embodiment of this invention, simply by way of illustration of one of the modes best suited to carry out the invention. As it will be realized, the invention is capable of other different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings.

Reference will now be made in detail to the present preferred embodiment of the invention, an example of which is illustrated in the accompanying drawings.

DETAILED DESCRIPTION OF THE PREFERRED EMBODIMENT

Figure 1:
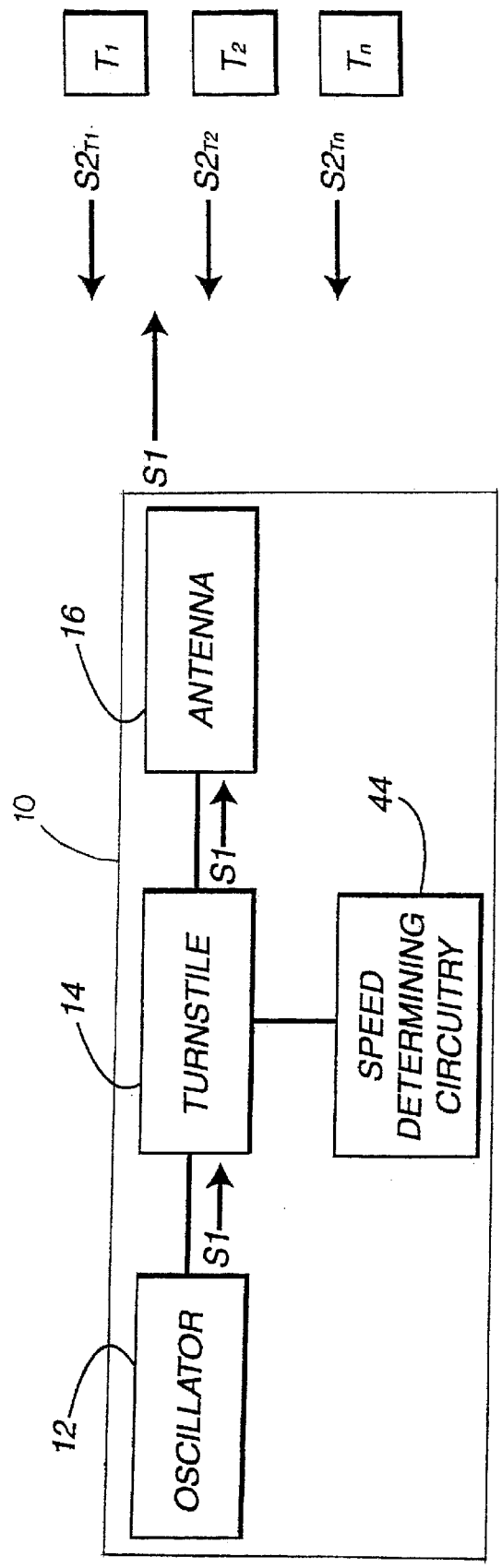
FIG. 1 is an overall schematic block diagram of the Doppler-based radar system of the present invention.

With reference now to the schematic block diagram of FIG. 1, there is shown a preferred embodiment of a Doppler-based radar system 10 for use in monitoring the speed of moving targets. More specifically, the radar system 10 of the present invention is adapted to determine the speed of a selected moving target traveling in generally the same direction as a moving platform supporting the radar system independent of the direction of the target relative to the platform. This allows the speed of target vehicles traveling in the same lane and in the same direction as the patrol vehicle to be monitored without manual intervention by the operator. The radar system 10 is further adapted in a stationary mode of operation to determine the speed of a selected moving target independent of the location of the patrol vehicle.

The radar system 10 includes a conventional Gunn diode oscillator to generate a constant wave radar signal S1. The radar or oscillator signal S1 is passed through a turnstile 14 to an antenna 16. In the preferred embodiment, the antenna is a circularly polarized horn antenna having a half-power beam width of thirteen (13) degrees in azimuth and elevation. The antenna 16 forms a transmitter to transmit the radar signal S1 toward at least one target $T_1, T_2 \ldots T_n$ and a receiver to receive the reflective return signals $S2_{T1}, S2_{T2} \ldots$ $S2_{Tn}$, respectively. The return signal $S2_{T1}$ is indicative, for example, of the speed of target $T_1$.

In accordance with well known Doppler principles, if the target $T_1$, for example, is moving toward or away from the antenna, the frequency (fr) of the transmitted signal S1 is shifted (fr±d) upon contacting the target $T_1$, thus forming the reflected radar signal $S2_{T1}$ in accordance with the speed of the target.

Figure 2:
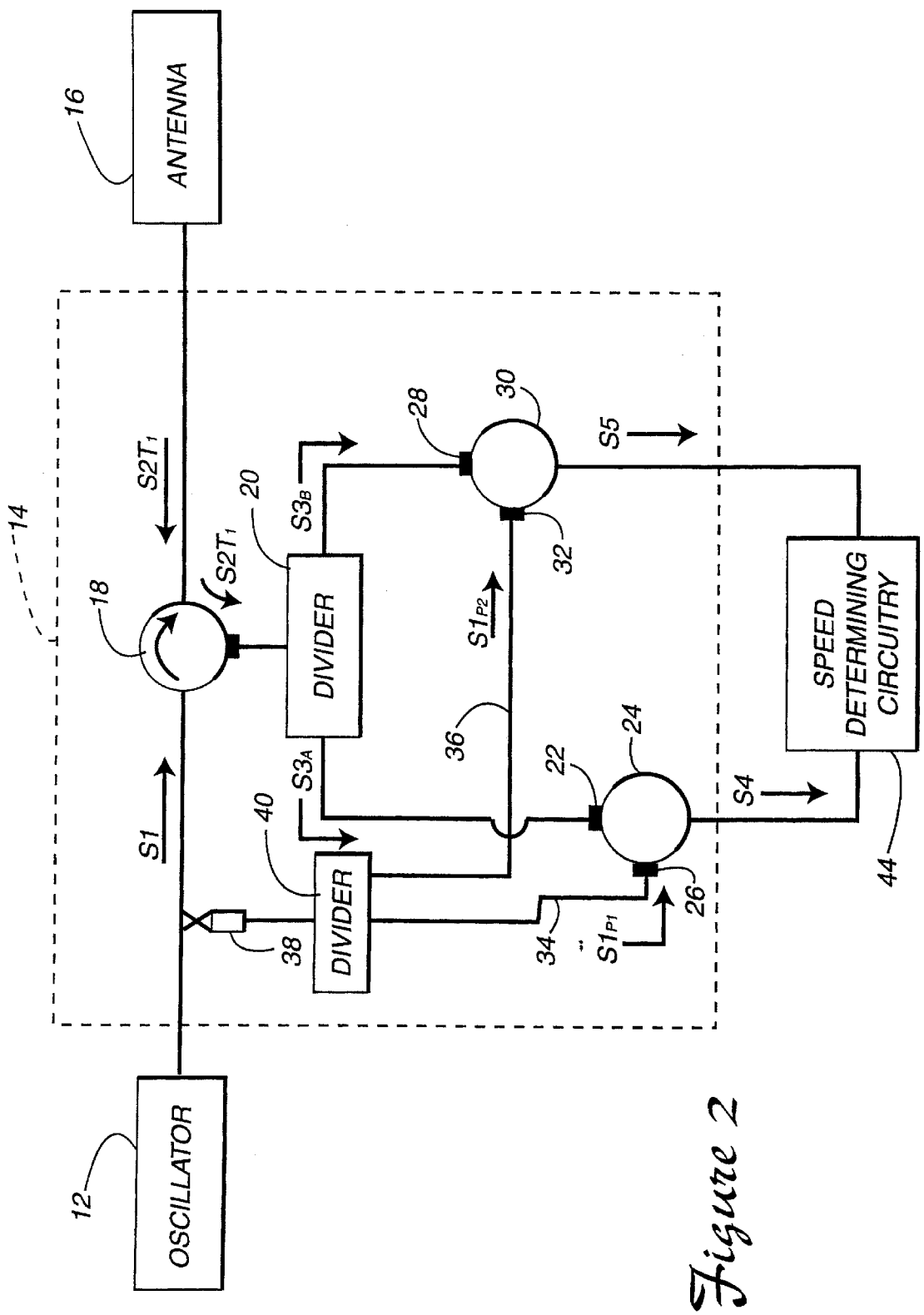
FIG. 2 is a detailed schematic block diagram of the turnstile of the present invention.

As shown in FIG. 2, the reflected return signals $S2_{T1} \ldots S2_{Tn}$ are received by the antenna 16 and forwarded to a duplexer 18 within the turnstile 14. In use, the duplexer 18 isolates each return signal, for example $S2_{T1}$, from the transmitted signal S1, converting the circularly polarized signals to linearly polarized signals. In the preferred embodiment, a splitter or divider 20 in the form of a Wilkinson divider within the turnstile 14 substantially splits the return signal $S2_{T1}$, thus generating first and second split signals $SA_A$, $SA_B$. The split signals $SA_A$, $SA_B$ are equivalent in phase and amplitude.

Also within the turnstile 14, the first split signal $SA_A$ is forwarded to a first receive port 22 of a mixer 24, or balanced mixer, where the signal $SA_A$ is combined with a first coupled portion of the transmitted signal $S1_{P1}$ or leakage signal forwarded to a second receive port 26 of the mixer 24. The mixer 24 combines the signals to form a test processing signal S4. Likewise, the second split signal $SA_B$ is forwarded to a second receive port 28 of a mixer 30 where the signal $S3_B$ is combined with a second coupled portion of the transmitted signal $S1_{P2}$ forwarded to a second receive port 32 of mixer 30. The mixer 30 combines the signals to form a reference processing signal S5.

In accordance with an important aspect of the present invention, the resultant processing signals S4 and S5 are substantially ninety degrees different in phase. For example, the microstrips or waveguides on/through which the split signals $SA_A$, $SA_B$ travel may be sufficiently different to cause the necessary difference in phase. In the present preferred embodiment, as shown in FIG. 2, microstrip transmission lines 34, 36 of differing lengths connect the output of a microstrip Wilkinson divider 40 that is driven by a waveguide coupled to microstrip coupler 38 to the second receive ports 26, 32 of mixers 24, 30 for coupling the portions of the transmitted signals $S1_{P1}$, $S1_{P2}$. Preferably the microstrip transmission line 34 for the test processing signal S4 is one quarter wavelength longer than the transmission line for the reference processing signal S5.

As indicated above, the resulting processing signals S4 and S5 are equal in magnitude but sufficiently different in phase to allow the radar system 10, and specifically the speed determining circuitry 44, to determine the direction of a selected target T1 relative to the platform P and to accurately calculate the resulting speed. The phase differential in the processing signals S4 and S5 also assists the radar system 10 to accurately calculate the direction and speed of a selected target in a stationary mode of operation.

Figure 3:
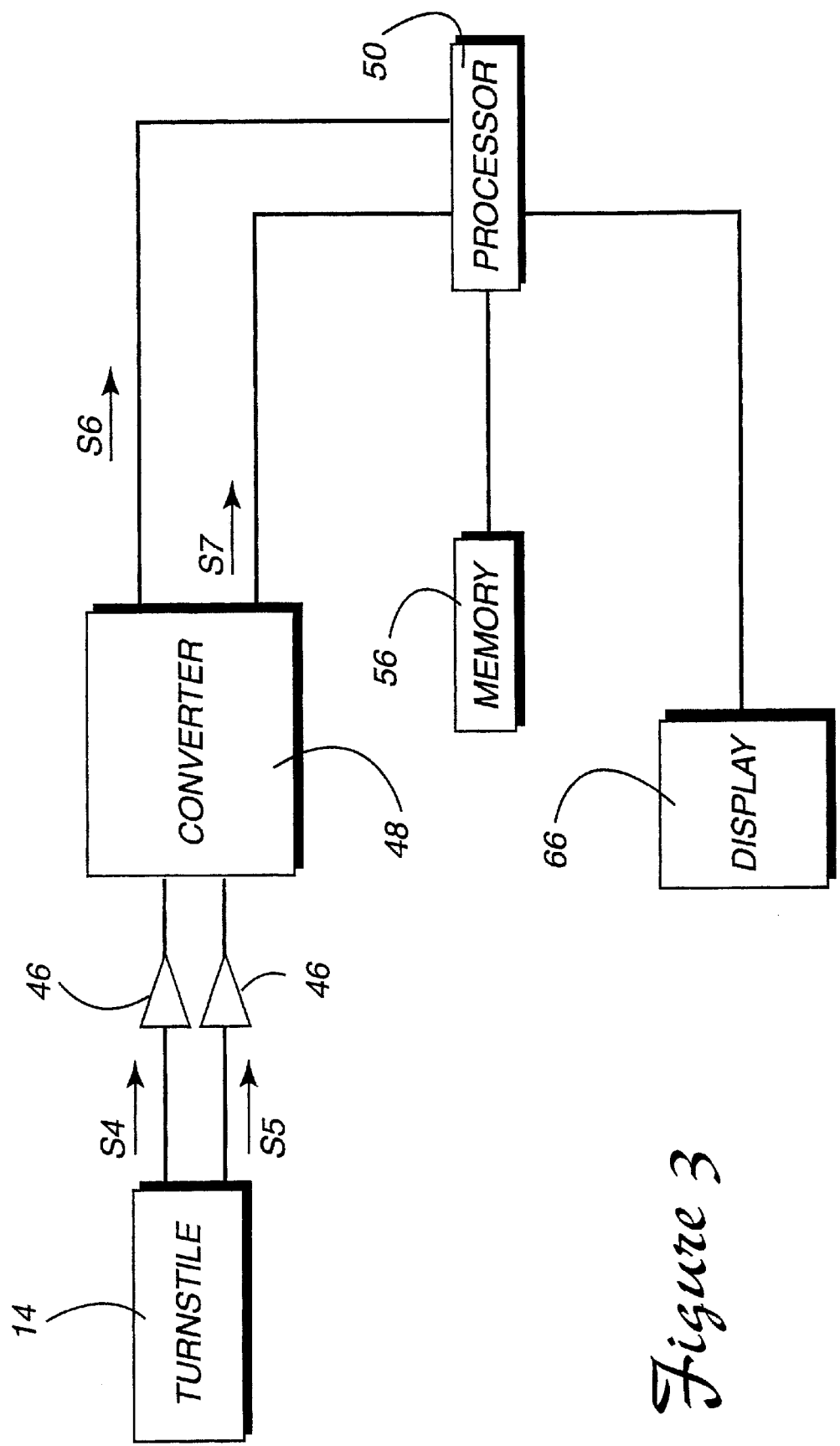
FIG. 3 is a schematic block diagram of the speed determining circuitry of the present invention.

As shown in FIG. 3, the resulting processing signals S4 and S5 are amplified by preamplifiers and converted into digital test and reference processing samples S6, S7 by an analog to digital converter 48. In the preferred embodiment, a stereo analog to digital converter is utilized to provide the processing samples S6, S7.

Figure 4:
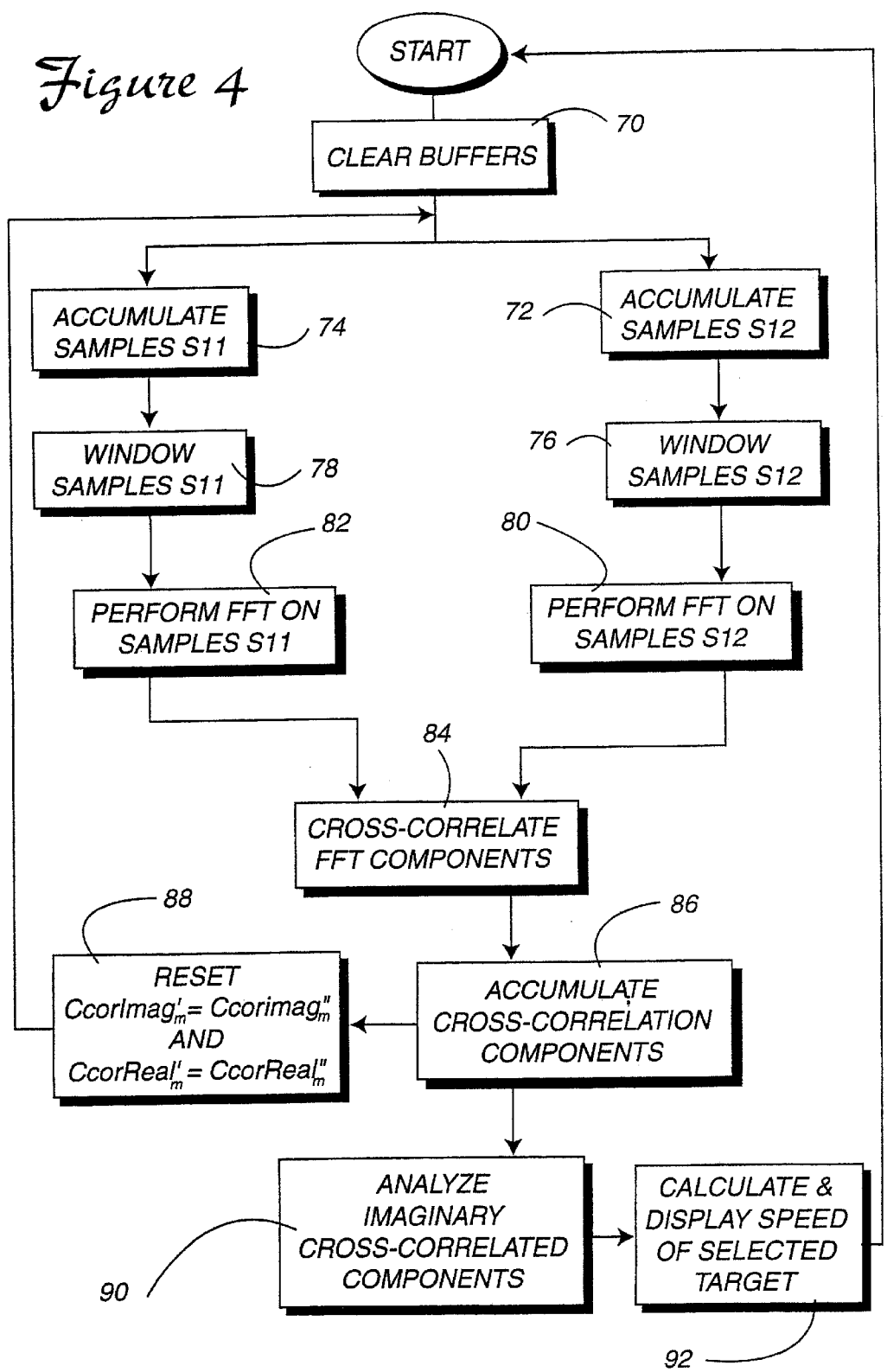
FIG. 4 is a software algorithm flowchart for determining the speed and direction of the at least one target utilizing cross-correlation.

In the present preferred embodiment of the present invention shown in schematic block diagram in FIG. 3, the test and reference processing samples S6, S7 are forwarded directly to processor 50 from converter 48 for processing in accordance with the flow chart shown in FIG. 4. Specifically, block 70 represents the processor 50 initially clearing the data buffers in RAM and blocks 72 and 74 represent the accumulation of N-points of the test and reference processing samples S6, S7 to form accumulated test and reference samples S11, S12. In the present preferred embodiment, the desired number of data points N in each sample S11, S12 is 1024, however, other sample lengths may be utilized.

Blocks 76 and 78 represent the application of a suitable weighted window to the accumulated samples S11, S12. Preferably, the window is a Blackman Harris window designed to provide a weighting coefficient to each of the N accumulated samples S11, S12. Weighting the accumulated samples in this manner minimizes the spectral line leakage between targets thus allowing maximum separation between targets and more accurate data for improved target selection.

In blocks 80 and 82, the weighted accumulated test and reference samples S11, S12 are transformed from the time domain to the frequency domain to provide test and reference frequency spectrums. As indicated above, the preferred embodiment utilizes a digital signal processor 50 to perform a real fast Fourier transform on each of the accumulated test and reference samples S11, S12. The resulting test and reference frequency spectrums each include a plurality of bins indicative of the Doppler components, i.e., real and imaginary components, of the at least one target including the amplitude and frequency of each target $T_1, T_2 \ldots T_n$. The resulting real and imaginary components for the accumulated sample S11 are mathematically represented as $X_{data}S11_m=\text{Real}[\text{FFT}(S11)_m]$ and $Y_{data}S11_m=\text{Imaginary}[\text{FFT}(S11)_m]$, respectively, where m=0, 1, . . . (N/2−1). Similarly, the resulting components for the accumulated sample S12 are mathematically represented as $X_{data}S12_m=\text{Real}[\text{FFT}(S12)_m]$ and $Y_{data}S12_m=\text{Imaginary}[\text{FFT}(S12)_m]$, respectively.

In accordance with an important aspect of the present preferred embodiment of the present invention, the resulting real components ($X_{data}S11_m$, $X_{data}S12_m$) and imaginary components ($Y_{data}S11_m$, $Y_{data}S12_m$) for each of the bins in the resulting frequency spectrums are cross-correlated in accordance with the following equations and as represented by block 84:

$$CcorReal_m=(X_{data}S11_m \cdot X_{data}S12_m)+(Y_{data}S11_m \cdot Y_{data}S12_m);$$

and $$CcorImag_m=(Y_{data}S11_m \cdot X_{data}S12_m)-(X_{data}S11_m \cdot Y_{data}S12_m),$$

where m=0, 1, . . . (N/2−1).

Figure 5:
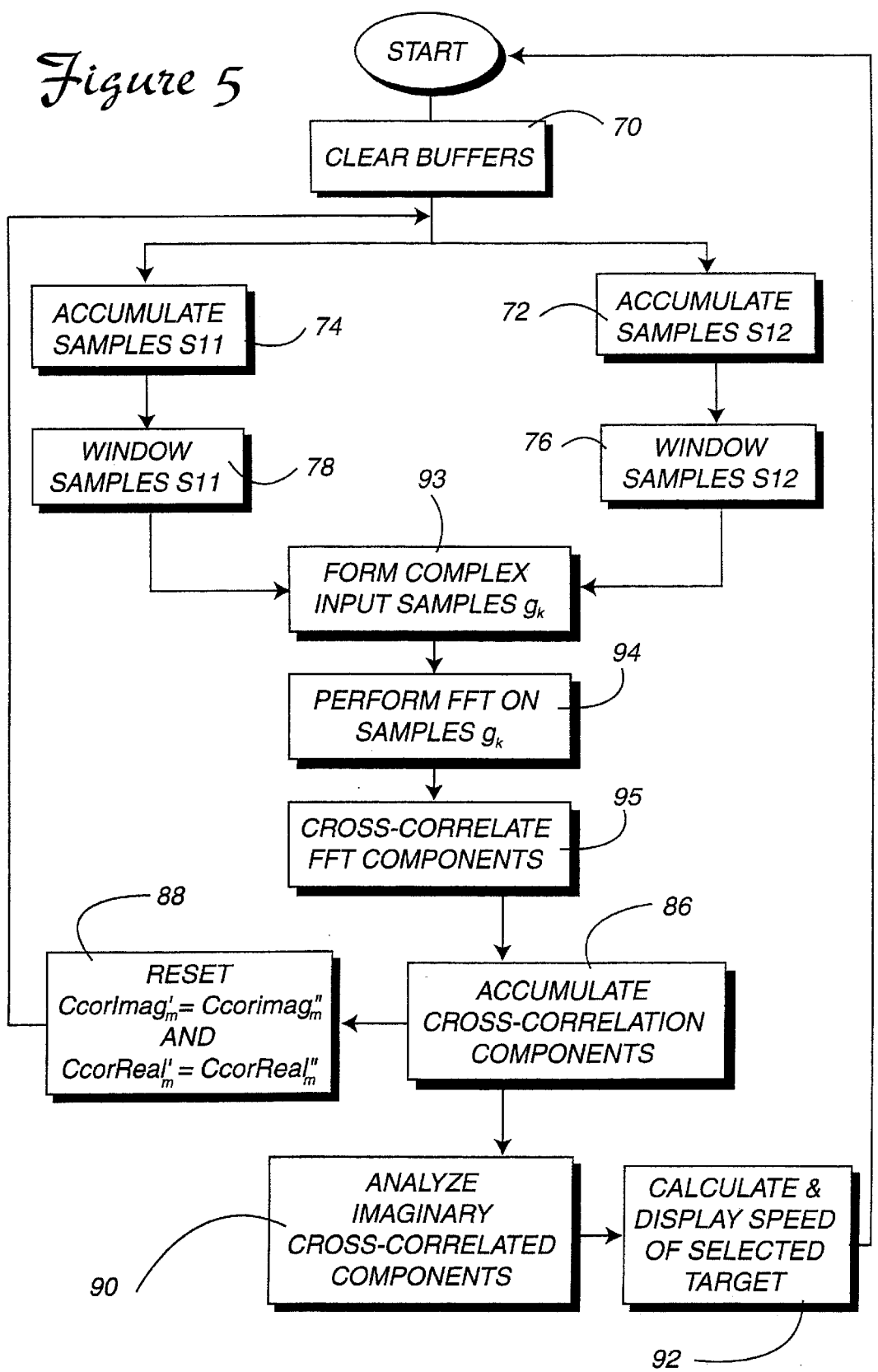
FIG. 5 is an alternate software algorithm flowchart for determining the speed and direction of the at least one target utilizing cross-correlation.

In an alternate embodiment of the present invention, the test and reference processing samples S6, S7 are forwarded directly to processor 50 from converter 48 for processing in accordance with the flow chart shown in FIG. 5. Specifically, block 70 represents the processor 50 initially clearing the data buffers in RAM, blocks 72 and 74 represent the accumulation of N-points of the test and reference processing samples S6, S7 to form accumulated test and reference samples S11, S12, and blocks 76 and 78 represent the application of a weighted window to the accumulated samples S11, S12 as described in the most preferred embodiment.

In the alternate embodiment, the digital signal processor 50 is utilized to perform a complex fast Fourier transform utilizing each of the accumulated test and reference samples S11, S12. Specifically, a set of N complex input samples ($g_k=S11_k+jS12_k$), is formed by utilizing input samples $S11_k$ as a real part of $g_k$ and samples $S12_k$ as an imaginary part of $g_k$ in block 93. A complex fast Fourier transform is performed on the input samples $g_k$ in block 94. The resulting frequency spectrum includes a plurality of bins indicative of the Doppler components, i.e., real and imaginary components, of the at least one target including the amplitude and frequency of each target $T_1, T_2 \ldots T_n$. The resulting real and imaginary components are mathematically represented as $$G_k = G_{REAL\ k} + jG_{IMAG\ k}, \text{ where } k=0, 1, \ldots (N-1), \text{ and } j=\sqrt{-1}.$$

In accordance with an important aspect of the alternate embodiment of the present invention, the resulting real components ($G_{REAL\ k}$) and imaginary components ($jG_{IMAG\ k}$) for each of the bins in the resulting frequency spectrum are cross-correlated in accordance with the following equations in block 95:

$$CcorReal_m = \frac{1}{2}[(GReal_m \cdot GImag_{N-m}) + (GReal_{N-m} \cdot GImag_m)];$$

and $$CcorImag_m = \frac{1}{4}[(GImag_m)^2 - (GImag_{N-m})^2 + (GReal_m)^2 - (GReal_{N-m})^2],$$

where $m=0, 1, \ldots (N/2-1)$.

Advantageously, cross-correlating the resulting Doppler components provides real and imaginary cross-correlated components which are indicative of the direction and speed of the at least one target. As represented by block 86 in the preferred and alternate embodiments of the present invention, subsequent cross-correlated components may be accumulated a desired number of times in accordance with the equations shown below in order to improve the signal to noise ratio:

$$CcorReal''_m = CcorReal'_m + CcorReal_m;$$

and $$CcorImag''_m = CcorImag'_m + CcorImag_m,$$

where $m=0, 1, \ldots (N/2-1)$, and $CcorReal'_m$ and $CcorImag'_m$ are each initially set to zero in block 70. Following each accumulation step in block 86, $CcorImag'_m$ and $CcorReal'_m$ are set to equal $CcorImag''_m$ and $CcorReal''_m$ respectively in block 88 before the accumulation of additional cross-correlation components.

The resulting imaginary cross-correlated components, e.g., $CcorImag''_m$, are analyzed as represented by block 90 in order to ascertain the direction of the at least one target and stored in memory 56 which may be any suitable internal or external memory device. If the resulting imaginary component is positive, the at least one target is approaching the platform and if the resulting imaginary component is negative, the at least one target is receding from the platform. In the present preferred embodiment, the positive (approaching) and negative (receding) imaginary cross-correlated components are stored in separate memory locations to facilitate their analysis depending upon the present mode of operation of the radar system 10.

As represented by block 92, the radar system next searches the resulting imaginary cross-correlated components and selects at least one target according to the present operating mode of the radar system. Specifically, in the same-lane moving modes of operation, both the positive and negative imaginary cross-correlated components may be searched for either a strongest target, i.e., a target having the largest amplitude, a fastest target, i.e., a target having the highest frequency, or both a strongest target and a fastest target. Alternately, in the opposite lane stationary modes of operation, either the positive or the negative imaginary cross-correlated components are searched for either a strongest target, a fastest target, or both a strongest target and fastest target dependent upon the placement of the patrol vehicle and the antenna within the patrol vehicle. For example, the operator of a patrol vehicle parked on the shoulder of a highway and utilizing a forward facing antenna may desire only to monitor traffic approaching the patrol vehicle on the opposite side of the highway as the stationary patrol vehicle. In this particular scenario, the radar system is set to ignore all negative imaginary cross-correlated components, or receding targets, from the target selection process, thus reducing unwanted targets traveling in the patrol vehicles own lane. Further, in the same-lane stationary modes of operation, either the positive or negative imaginary cross-correlated components may be searched for either a strongest target, a fastest target, or both a strongest target and fastest target. For example, the operator of a patrol vehicle parked on a shoulder of a divided highway and utilizing a rear facing antenna may desire only to monitor traffic on the same side of the divided highway as the patrol vehicle. In this particular scenario, the radar system is set to ignore all negative imaginary cross-correlated components, or receding targets, from the target selection process, thus reducing unwanted targets traveling in the opposite lane as the patrol vehicle.

The above examples serve to describe only a few of the several potential scenarios in which a typical Doppler-based radar system is operated. These different scenarios are well known in the art and each potential scenario and which of either or both of the positive and negative imaginary cross-correlated components require searching need not be discussed in detail for the purpose of describing the present invention.

Once the step of selecting the at least one target is accomplished, the speed of the at least one target is calculated dependent upon the determined direction of the at least one target and displayed by the radar system 10 for the operator's use. In accordance with an important aspect of the present invention, the step of selecting a target may occur after the direction of each potential target is determined. Importantly, this allows for the speed of multiple targets to be determined and displayed, if desired.

In summary, the overall flexibility and reliability of the Doppler-based traffic radar system 10 of the present invention is enhanced. This improvement is accomplished primarily by cross-correlating the resulting frequency spectrum(s) to obtain a cross-correlation spectrum of real and imaginary cross-correlated components from which targets are selected dependent upon a mode of operation of the radar system. Specifically, the radar system 10 is adapted to split the return signals $S2_{T1} \ldots S^2Tn$ and to shift the phase of one of the split signals $SA_A$, $SA_B$ within the turnstile 14. The split signals $SA_A$, $SA_B$ are next converted into digital processing samples S6, S7 for further processing by the speed determining circuitry 44. In particular, the processing samples are transformed into the frequency domain and cross-correlated forming cross-correlation components. The radar system selects a target from the imaginary cross-correlation components according to the present operating mode of the radar system and calculates the speed of the at least one target dependent upon a determined direction of the target and displays the speed for the operator's use.

The foregoing description of a preferred and alternate embodiment of the invention has not been presented to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A method for determining the speed of a selected moving target traveling in generally the same direction as a moving platform supporting a Doppler-based radar system and independent of the direction of the target relative to the platform comprising the steps of:

transmitting a signal from the platform toward at least one target;

receiving a return signal reflected from the at least one target, said return signal indicative of the speed of the at least one target including the platform;

forming a test processing signal and a reference processing signal such that said processing signals are different in phase;

transforming samples of said test and said reference processing signals into the frequency domain to provide at least one spectrum including a plurality of bins indicative of Doppler components of the at least one target;

cross-correlating said Doppler components to provide a cross-correlation spectrum;

selecting the moving target from said cross-correlation spectrum dependent upon a mode of operation of the radar system;

determining a direction of the at least one target relative to the platform;

calculating the speed of the selected moving target dependent upon the direction of the target; and displaying the speed of the selected moving target, whereby the speed of the selected moving target is determined independent of the relative direction of the target to the platform and of operator intervention.

2. The method as claimed in claim 1, wherein said cross-correlation spectrum includes real and imaginary cross-correlated components; and wherein the step of determining the direction of the at least one target relative to the platform includes the step of analyzing said imaginary cross-correlated components, said imaginary components being positive when the at least one target is approaching the platform and negative when the at least one target is receding from the platform.

3. The method as claimed in claim 2, wherein the step of transforming samples of said test and said reference processing signals into the frequency domain includes the steps of performing a first fast fourier transform on said samples of said test processing signal to provide a test spectrum including a plurality of bins indicative of Doppler components of the at least one target; and performing a second fast fourier transform on said samples of said reference processing signal to provide a reference spectrum including a plurality of bins indicative of Doppler components of the at least one target.

4. The method as claimed in claim 2, wherein the step of transforming samples of said test and said reference processing signals into the frequency domain includes the steps of performing a complex fast fourier transform using one of either said test samples or said reference samples as real inputs and a remaining said test samples or said reference samples as imaginary inputs to provide a spectrum including a plurality of bins indicative of Doppler components of the at least one target.

5. The method as claimed in claim 1, further comprising the step of windowing said samples of said test and said reference processing signals.

6. A method for determining the speed of a selected moving target traveling in generally the same direction as a moving platform supporting a Doppler-based radar system and independent of the direction of the target relative to the platform comprising the steps of:

transmitting a signal from the platform toward at least one target;

receiving a return signal reflected from the at least one target, said return signal indicative of the speed of the at least one target including the platform;

forming a test processing signal and a reference processing signal such that said processing signals are different in phase by substantially splitting said return signal into first and second split signals and mixing said first split signal with a first portion of the transmitting signal and said second split signal with a second portion of the transmitting signal, said first and second portions being different in phase;

transforming samples of said test and said reference processing signals into the frequency domain to provide at least one spectrum including a plurality of bins indicative of Doppler components of the at least one target;

cross-correlating said Doppler components to provide a cross-correlation spectrum;

selecting the moving target from said cross-correlation spectrum dependent upon a mode of operation of the radar system;

determining a direction of the at least one target relative to the platform;

calculating the speed of the selected moving target dependent upon the direction of the target; and displaying the speed of the selected moving target.

7. The method as claimed in claim 6, wherein said cross-correlation spectrum includes real and imaginary cross-correlated components; and wherein the step of determining the direction of the at least one target relative to the platform includes the step of analyzing said imaginary cross-correlated components, said imaginary components being positive when the at least one target is approaching the platform and negative when the at least one target is receding from the platform.

8. The method as claimed in claim 7, wherein the step of transforming samples of said test and said reference processing signals into the frequency domain includes the steps of performing a first fast fourier transform on said samples of said test processing signal to provide a test spectrum; and performing a second fast fourier transform on said samples of said reference processing signal to provide a reference spectrum.

9. The method as claimed in claim 7, wherein the step of transforming samples of said test and said reference processing signals into the frequency domain includes the steps of performing a complex fast fourier transform using one of either of said test or reference samples as real inputs and the remaining test or reference samples as imaginary inputs to provide a spectrum.

10. The method as claimed in claim 7, wherein said cross-correlation spectrum includes bins indicative of the amplitude and frequency of the at least one target; and wherein the step of selecting the moving target from said spectrum includes selecting the at least one target having the largest amplitude or the highest frequency dependent upon a mode of operation of the radar system.

11. A Doppler-based radar system for determining the speed of at least one selected moving target traveling in generally the same direction as a moving platform supporting said radar system and independent of the direction of the target relative to the platform comprising:

an oscillator to generate a signal;

an antenna to transmit said oscillator signal toward the at least one target and to receive a return signal reflected from the at least one target, said return signal indicative of the frequency of the at least one target and the platform;

a turnstile in communication with said antenna for receiving said return signal and forming a test processing signal and a reference processing signal such that said signals are different in phase;

a processor programmed to transform samples of said test processing signal and said reference processing signal into the frequency domain to provide at least one spectrum having a plurality of bins indicative of Doppler components of the at least one target, and to cross-correlate said Doppler components to provide a cross-correlation spectrum including a plurality of bins which are indicative of the relative speed and direction of the at least one target, whereby the speed of the at least one target may be determined independent of the relative direction of the at least one target to the platform.

12. The radar system of claim 11, wherein said processor is programmed to select the at least one target from said cross-correlation spectrum dependent upon a mode of operation of the radar system, determine a direction of the at least one target, and calculate a speed of the at least one target dependent upon the direction of the target.

13. The radar system of claim 11, wherein said cross-correlation spectrum includes real and imaginary cross-correlated components; and wherein said processor is programmed to analyze said imaginary cross-correlated components to determine the direction of the at least one target relative the platform, said imaginary components being positive when the at least one target is approaching the platform and negative when the at least one target is receding from the platform.

14. The radar system of claim 13, wherein said processor transforms said samples of said test and reference processing signals into the frequency domain by performing a first fast fourier transform on said samples of said test processing signal to provide a test spectrum and a second fast fourier transform on said samples of said reference processing signals to provide a reference spectrum.

15. The radar system of claim 13, wherein said processor transforms said samples of said test and reference processing signals into the frequency domain by performing a complex fast fourier transform using one of either of said test samples or said reference samples as real inputs and a remaining said test samples or said reference samples as imaginary inputs to provide a spectrum including a plurality of bins indicative of Doppler components of the at least one target.

16. The radar system of claim 11, further comprising a display, said display for showing the speed of the at least one target.

17. A Doppler-based radar system selectively operable to determine the speed of a moving target traveling in generally the same direction as a platform supporting said radar system and independent of the direction of the target relative to the platform comprising:

an oscillator to generate a signal;

an antenna to transmit said oscillator signal toward at least one target and to receive a return signal reflected from the at least one target, said return signal indicative of the frequency of the at least one target and the platform;

a turnstile in communication with said antenna for receiving said return signal and forming a test processing signal and a reference processing signal such that said signals are different in phase; and circuitry for determining a direction of the at least one target relative to the platform by transforming samples of said test and reference processing signals into the frequency domain to provide at least one spectrum and cross-correlating components of said at least one spectrum to provide a cross-correlation spectrum, and calculating the speed of a selected target dependent upon a mode of operation of the radar system.

18. The radar system of claim 17 wherein said circuitry includes a processor.

19. The radar system of claim 18, wherein said processor transforms said samples of said test and reference processing signals into the frequency domain by performing a first fast fourier transform on said samples of said test processing signal to provide a test spectrum including a plurality of bins indicative of Doppler components of the at least one target and a second fast fourier transform on said samples of said reference processing signals to provide a reference spectrum including a plurality of bins indicative of Doppler components of the at least one target.

20. The radar system of claim 19, wherein said cross-correlation spectrum includes real and imaginary cross-correlated components; and wherein the processor determines the direction of the at least one target relative to the platform by analyzing said imaginary cross-correlated components, said imaginary components being positive when the at least one target is approaching the platform and negative when the at least one target is receding from the platform.

21. The radar system of claim 18, wherein said processor transforms said samples of said test and reference processing signals into the frequency domain by performing a complex fast fourier transform using one of either said test or reference samples as real inputs and the remaining said test or reference samples as imaginary inputs to provide a spectrum including a plurality of bins indicative of Doppler components of the at least one target.

22. The radar system of claim 21, wherein said cross-correlation spectrum includes real and imaginary cross-correlated components; and wherein the processor determines the direction of the at least one target relative to the platform by analyzing said imaginary cross-correlated components, said imaginary components being positive when the at least one target is approaching the platform and negative when the at least one target is receding from the platform.

23. A method for determining the speed of at least one moving target traveling in generally the same direction as a platform supporting a Doppler-based radar system and independent of the direction of the at least one target relative to the platform comprising the steps of:

transmitting a signal from the platform toward the at least one target;

receiving a return signal reflected from the at least one target, said return signal indicative of the speed of the at least one target including the platform;

forming a test processing signal and a reference processing signal such that said processing signals are different in phase;

analyzing cross-correlated components of a fourier transform of samples of said test and reference processing signals to determine a direction of the at least one target relative to the platform;

calculating the speed of the at least one target dependent upon the direction of the at least one target; and displaying the speed of at least one selected target of the at least one target.

24. The method as claimed in claim 23, wherein the step of analyzing cross-correlated components of a fourier transform includes transforming samples of said test and said reference processing signals into the frequency domain to provide at least one spectrum including a plurality of bins indicative of Doppler components of the at least one target; and cross-correlating said Doppler components to provide a cross-correlation spectrum including a plurality of bins indicative of Doppler components of the at least one target.

25. The method as claimed in claim 24, wherein the step of transforming samples of said test and said reference processing signals into the frequency domain includes the steps of performing a first fast fourier transform on said samples of said test processing signal to provide a test spectrum; and performing a second fast fourier transform on said samples of said reference processing signal to provide a reference spectrum.

26. The method as claimed in claim 24, wherein the step of transforming samples of said test and said reference processing signals into the frequency domain includes the steps of performing a complex fast fourier transform using one of either said test samples or said reference samples as real inputs and a remaining said test samples or said reference samples as imaginary inputs to provide a spectrum including a plurality of bins indicative of Doppler components of the at least one target.

27. A method for determining the speed of a selected moving target from a stationary platform supporting a Doppler-based radar system comprising the steps of:

transmitting a signal from the platform toward at least one target;

receiving a return signal reflected from the at least one target, said return signal indicative of the speed of the at least one target;

forming a test processing signal and a reference processing signal such that said processing signals are different in phase;

transforming samples of said test and said reference processing signals into the frequency domain to provide at least one spectrum including a plurality of bins indicative of Doppler components of the at least one target;

cross-correlating said Doppler components to provide a cross-correlation spectrum;

selecting the moving target from said cross-correlation spectrum dependent upon a mode of operation of the radar system;

calculating and displaying the speed of the selected moving target, whereby all approaching or receding targets of said at least one target are selectively eliminated from consideration in the selecting step dependent upon said mode of operation of the radar system.

28. The method as claimed in claim 27, wherein said cross-correlation spectrum includes real and imaginary cross-correlated components; and wherein the step of selecting the moving target from said cross-correlation spectrum includes the step of analyzing said imaginary cross-correlated components, said imaginary components being positive when the at least one target is approaching the platform and negative when the at least one target is receding from the platform.

29. The method as claimed in claim 27, wherein the step of transforming samples of said test and said reference processing signals into the frequency domain includes the steps of performing a first fast fourier transform on said samples of said test processing signal to provide a test spectrum including a plurality of bins indicative of Doppler components of the at least one target; and performing a second fast fourier transform on said samples of said reference processing signal to provide a reference spectrum including a plurality of bins indicative of Doppler components of the at least one target.

30. The method as claimed in claim 27, wherein the step of transforming samples of said test and said reference processing signals into the frequency domain includes the steps of performing a complex fast fourier transform using one of either said test samples or said reference samples as real inputs and a remaining said test samples or said reference samples as imaginary inputs to provide a spectrum including a plurality of bins indicative of Doppler components of the at least one target.

* * * * *